United States Patent [19]

Getson

[11] 4,172,101
[45] Oct. 23, 1979

[54] MODIFIED ORGANOPOLYSILOXANE COMPOSITIONS

[75] Inventor: John C. Getson, Adrian, Mich.

[73] Assignee: SWS Silicones Corporation, Adrian, Mich.

[21] Appl. No.: 896,255

[22] Filed: Apr. 14, 1978

[51] Int. Cl.$^2$ ............................................. C08L 43/04
[52] U.S. Cl. ............................. 525/101; 204/159.13; 204/159.22; 260/448.2 E; 260/448.2 Q; 528/15; 528/25; 528/31; 528/32; 528/33; 528/43; 526/279; 525/477
[58] Field of Search ............... 260/448.2 E, 448.2 Q, 260/825, 827; 204/159.13, 159.22; 526/279; 528/15, 25, 31, 32, 33, 11, 43

[56] References Cited

U.S. PATENT DOCUMENTS

| | | | |
|---|---|---|---|
| 2,820,798 | 1/1958 | Bailey et al. | 260/326.5 |
| 2,928,806 | 3/1960 | Bailey et al. | 528/32 |
| 3,663,649 | 5/1972 | Wheeler, Jr. | 260/827 |
| 3,723,497 | 3/1973 | Baney | 260/825 |
| 3,808,287 | 4/1974 | Thomas | 260/827 |
| 3,829,529 | 8/1974 | Lengnick | 260/827 |
| 3,950,300 | 4/1976 | Hittmair et al. | 260/827 |
| 4,014,851 | 3/1977 | Bluestein | 260/827 |

*Primary Examiner*—Melvyn I. Marquis

[57] ABSTRACT

Modified organopolysiloxane compositions containing in situ generated particulate matter and a method for preparing the same which comprises polymerizing organic monomers having aliphatic unsaturation in the presence of vinyl containing organopolysiloxanes and free radical initiators at an elevated temperature to form a composition in which one or more of the organopolysiloxane molecules have organic groups grafted thereto through a carbon-to-carbon linkage. The resultant composition may be cured to an elastomeric solid by combining the composition obtained from the polymerization with organosilicon compounds having an average of more than two hydrogen atoms per molecule and a catalyst which promotes the addition of SiH groups to vinyl groups.

18 Claims, No Drawings

MODIFIED ORGANOPOLYSILOXANE COMPOSITIONS

This invention relates to modified organopolysiloxanes, particularly to organopolysiloxane compositions containing in situ generated particulate matter in which at least one organopolysiloxane molecule has an organic group grafted thereto. More particularly, the invention relates to cured organopolysiloxanes having improved physical properties and to a method of preparing same.

BACKGROUND OF THE INVENTION

Modified organopolysiloxanes have been prepared heretofore by polymerizing monomers containing aliphatic unsaturation in the presence of organopolysiloxanes containing terminal hydroxyl or hydrolyzable groups and free radical initiators as shown in U.S. Pat. Nos. 3,555,109 and 3,776,875 to Getson. Also U.S. Pat. No. 3,631,087 to Lewis describes a process for preparing modified organopolysiloxanes by gradually adding a mixture of monomers and free radical initiators to preheated organopolysiloxanes. U.S. Pat. No. 3,694,478 to Adams et al discloses a process for preparing modified organopolysiloxanes by the gradual addition of free radical initiators to a preheated mixture containing an organopolysiloxane and an organic monomer having aliphatic unsaturation. U.S. Pat. No. 4,032,499 to Kreuzer et al describes a process for preparing modified organopolysiloxanes by polymerizing monomers containing aliphatic unsaturation in the presence of organopolysiloxanes containing hydrolyzable or hydroxyl groups and free radical initiators and an inert liquid having a boiling point up to about 100° C. at 760 mm Hg (abs.) in which the inert liquid is a nonsolvent for the organopolysiloxanes and the resultant reaction product at the polymerization temperature. It has been found that the modified organopolysiloxanes prepared above have a tendency to shrink during curing. This property is especially undesirable when the composition is used as a molding or potting composition.

Polyolefin filled vinylorganopolysiloxane compositions have been described in U.S. Pat. No. 4,014,851 to Bluestein, in which monomers having aliphatic unsaturation are polymerized in the presence of vinylorganopolysiloxanes and free radical initiators to form a two phase system, one being a continuous phase consisting of ungrafted vinylorganopolysiloxanes and the other phase being a discontinuous phase containing finely divided particles of ungrafted polymer.

Heretofore, it was thought that when organic monomers containing aliphatic unsaturation were polymerized in the presence of vinyl containing organopolysiloxanes, that the organic monomers or polymers would add to the vinyl groups and thus produce a composition which would be incapable of being cured by SiH addition. Surprisingly, applicant has found that monomers containing aliphatic unsaturation may be polymerized in the presence of vinyl containing organopolysiloxanes to form organopolysiloxanes having organic groups grafted thereto through a carbon-to-carbon linkage without destroying the ability of the vinyl containing organopolysiloxanes to react with SiH containing organosilicon compounds to form elastomeric solids. Moreover, applicant has found that the compositions obtained in accordance with this invention contain organopolysiloxanes having organic groups grafted to a silicon atom through a carbon-to-carbon linkage, whereas U.S. Pat. No. 4,014,851 teaches that the composition obtained from the process described therein is essentially free of grafted organopolysiloxanes.

Therefore, it is an object of this invention to provide an organopolysiloxane composition containing in situ generated particulate matter. Another object of this invention is to provide a method for preparing a modified organopolysiloxane composition in which at least one organopolysiloxane molecule has an organic group grafted thereto. Still another object of this invention is to prepare a modified organopolysiloxane composition by polymerizing vinyl monomers containing aliphatic unsaturation in the presence of vinyl containing organopolysiloxanes and free radical initiators. A further object of this invention is to provide curable compositions containing in situ generated particulate matter. A still further object of this invention is to provide elastomeric compositions having improved physical properties.

SUMMARY OF THE INVENTION

The foregoing objects and others which will become apparent from the following description are accomplished by polymerizing organic monomers or low molecular weight polymers having aliphatic unsaturation in the presence of vinyl containing organopolysiloxanes and free radical initiators at an elevated temperature to form a composition in which at least one organopolysiloxane molecule has an organic group grafted thereto through a carbon-to-carbon bond. The resultant composition can be combined with an Si-H containing compound having on the average more than two silicon-bonded hydrogen atoms per molecule and a catalyst which promotes the addition of Si-H groups to vinyl groups to form elastomers.

DETAILED DESCRIPTION OF THE INVENTION

Organopolysiloxanes having at least two vinyl groups per molecule which may be used in the practice of this invention may be represented by the average unit formula $$(R)_a (R')_b \text{SiO}_{\frac{4-a-b}{2}} \qquad \text{I}$$

where R is a monovalent hydrocarbon radical free of aliphatic unsaturation, R' is a vinyl group, i.e., $CH_2=CH-$, linked to the silicon atom by a silicon-carbon linkage, a has a value of from 0 to 2.5 and preferably from 0.5 to 2.1 and b has a value of from 0.0005 to 2.0 and the sum of a and b is a number of from 1.0 to 3.

Examples of suitable monovalent hydrocarbon radicals are alkyl radicals having from 1 to 18 carbon atoms, such as methyl, ethyl, propyl, butyl, hexyl, octyl, decyl and octadecyl radicals; cycloalkyl radicals such as the cyclopentyl and cyclohexyl radicals; aryl radicals such as the phenyl and naphthyl radicals; alkaryl radicals such as the benzyl radical, the alpha, beta phenyl-ethyl radicals and the alpha, beta phenyl-propyl radicals. It is preferred that the R groups in Formula I have from 1 to 3 carbon atoms and more preferably R is a methyl radical. Formula I is intended to include organopolysiloxanes wherein the R groups are mixtures of the aforesaid radicals. For purposes of this invention, the vinyl containing organopolysiloxanes represented by Formula I above have a viscosity in the range of from 10 to 10,000,000 centipoise at 25° C. and more preferably from 50 to 5,000,000 centipoise at 25° C.

It is understood, that Formula I is intended to include vinyl containing organopolysiloxanes which have terminal vinyl groups or have vinyl groups along the chain or which are vinyl terminated and also contain vinyl groups along the chain. It is preferred that the vinyl containing organopolysiloxanes have on the average at least two silicon bonded vinyl groups per molecule, especially if the resultant composition is to be converted to an elastomer.

Preferred vinylorganopolysiloxanes within the scope of Formula I are vinyl terminated diorganopolysiloxanes having the general formula

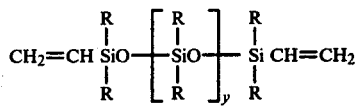

in which R is the same as above and y has a value sufficient to provide a viscosity of from about 10 to 10,000,000 centipoise at 25° C. Vinyl containing organopolysiloxanes are well known as illustrated by U.S. Pat. Nos. 3,159,662, 3,220,972 and 3,436,366.

Specific examples of vinylorganopolysiloxanes within the scope of Formula I are vinylpentamethyldisiloxane, 1,3-divinyltetramethyldisiloxane, 1,1,3-trimethyl-1,3,3-trivinyldisiloxane, 1,1,3,3-tetravinyldimethyldisiloxane as well as higher polymers containing up to 100,000 or more silicon atoms per molecule. Also included in Formula I are cyclic siloxanes containing silicon bonded vinyl groups such as the cyclic trimer, tetramer or pentamer of methylvinyl siloxane [(CH$_2$=CH)(CH$_3$) SiO]. The preferred cyclic siloxane is the tetramethyltetravinylcyclotetrasiloxane.

The vinylorganopolysiloxanes represented by Formula I may also be copolymers having (1) siloxane units of the formula

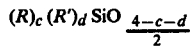

where R and R' are the same as above, c has a value of 0, 7 or 2, d has a value of 1 or 2 and the sum of c and d is equal to 1, 2 or 3 and the remaining siloxane units in the organopolysiloxane being units of the formula

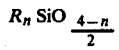

where R is the same as above and n has a value of 0, 1, 2 or 3. Thus when the vinyl organopolysiloxane is a copolymer having siloxane units within the scope of Formula II and siloxane units within the scope of Formula III, the copolymer generally contains from 0.1 to 99.5 mol percent of units within the scope of Formula II and from 0.5 to 99.9 mol percent of units within the scope of Formula III.

Also, included among the vinylorganopolysiloxanes are those polysiloxane compositions containing mixtures of organopolysiloxanes containing vinyl groups.

Any polymerizable organic monomer having aliphatic unsaturation may be polymerized in the presence of vinyl containing organopolysiloxanes. Examples of suitable organic monomers are low molecular weight straight-chain hydrocarbons such as ethylene, propylene, butylene; vinyl halides such as vinyl chloride and vinyl fluoride; vinyl esters of organic acids such as vinyl acetate; styrene, ring-substituted styrenes and other vinyl aromatics such as vinylpyridine and vinylnaphthalene; acrylic acid and derivatives of acrylic acid including the salts, esters, amides and acrylonitrile; N-vinyl compounds such as N-vinylcarbazole, N-vinylpyrrolidone and N-vinylcaprolactam; and vinyl silicon compounds such as vinyltriethoxysilane.

Disubstituted ethylenes of the type CH$_2$=CX$_2$ may be used including vinylidene fluoride, vinylidene chloride, vinylidene cyanide, methacrylic acid and compounds derived therefrom such as the salts, esters and amides as well as methacrolein, methacrylonitrile and the like.

Examples of disubstituted ethylenes of the type CHX=CHX such as vinylene carbonate and various monomers which polymerize best in the presence of other monomers, e.g. maleic anhydride, esters of maleic and fumaric acids, stilbene, indene and coumarone may be used in the formation of the polymeric compositions of this invention.

Other monomers which may be employed in the polymerization are polyfunctional olefinic monomers, i.e., those having at least two olefinic linkages, such as allyl methacrylate, allyl acrylate, diallyl adipate, methallyl acrylate, methallyl methacrylate, vinyl acrylate, vinyl methacrylate, hydrocarbons such as divinylbenzene and vinyl cyclohexene; polyol esters of acrylic and methacrylic acid, e.g., ethylene dimethacrylate, tetramethylene diacrylate and pentaerythritol tetramethacrylate and conjugated diolefins such as 1,3-butadiene, isoprene and chloroprene.

These monomers may be used singly or in combinations of two or three or even more. The properties of the resultant product, of course, depend on the type of monomeric material as well as on the amounts used relative to the vinyl containing organopolysiloxanes. Monomers that give elastomeric homopolymers generally provide elastomeric reaction products while those that give plastic homopolymers tend to yield products which are less elastic.

The reaction is most expeditiously effected by using a free-radical initiator, normally organic peroxides, although other free-radical initiators such as azo-compounds in which both the N atoms of the azo linkage are attached to a tertiary carbon atom and the remaining valences of the tertiary carbon atom are satisfied by nitrile, carboxylalkyl, cycloalkylene or alkyl radicals, preferably having from 1 to 18 carbon atoms. In addition to the above mentioned initiators, ionizing radiation may also be used to bring about the formation of free radicals.

The most suitable peroxide initiators are compounds of the formula, ROOH or compounds of the formula, ROOR in which R is an organic radical. Specific examples of peroxides which are operative in this invention are hydroperoxides such as t-butyl hydroperoxide, cumene hydroperoxide, decaline hydroperoxide; dialkyl peroxides such as di-t-butyl and dicumyl peroxide; cyclic peroxides such as ascaridole and 1,5-dimethylhexane-1,5-peroxide; peresters such as t-butyl perbenzoate, t-butyl peroxyisopropylcarbonate and t-butyl peroctoate; and ketone peroxides such as acetone peroxide and cyclohexanone peroxide.

Acyl peroxides and peracids may be used in the practice of this invention, but in general they result in less grafting, i.e., poor yields of the grafted product. The difference is believed to lie in the nature of the radicals produced. Thus tertiary alkoxy radicals from di-t-butyl peroxide, for example have a tendency to abstract hydrogen atoms from the organic groups linked to the silicon atoms, which is a possible mechanism in grafting. On the other hand, acyloxy radicals produced from an acyl peroxide, e.g., benzoyl peroxide, while effective polymerization initiators are relatively ineffective in abstracting hydrogen atoms from the organic groups linked to the silicon atoms.

The amount of free-radical initiator employed is not critical and as little as 0.05 percent of the more active peroxide initiators based on the weight of the monomer is generally adequate in most cases. However, where it is desirable to increase the reaction rate, then as much as 3 percent or even more of the initiators may be used. As a general rule, it is advisable not to exceed about 5 percent concentration, since higher concentrations tend to promote cross-linking and thus cause an undesirable increase in the viscosity of the reaction mixture.

These free radical initiators can be employed with any monomer desired. When, for example, the half-life of the free radical initiator in toluene is more than 2 hours at the polymerization temperature, then a portion of the total amount or all of the free radical initiator can be mixed with the vinyl containing organopolysiloxane and monomer containing aliphatic unsaturation. However, if the half-life of the free radical initiator in toluene is less than 2 hours at the polymerization temperature, then it is preferred that the free radical initiator be added in increments or continuously during the polymerization.

The polymerization of monomers containing aliphatic unsaturation and the vinyl containing organopolysiloxanes may be conducted in the absence or presence of a liquid medium which is inert or nonreactive with the polymerization components, the polymerization products as well as in situ generated particulate matter. It is preferred that the liquid medium have a boiling point below about 130° C. at 760 mm Hg (abs.) and be a nonsolvent for polymers obtained as a result of the polymerization at the polymerization temperature. Examples of suitable inert liquids which may be employed are water, methanol and saturated aliphatic hydrocarbons, aliphatic fluoro and chloro hydrocarbons in which three halogen atoms are linked to at least one carbon atom. Water is the preferred inert liquid, since it is readily available and the vinyl containing organopolysiloxanes, monomers and the polymers obtained from the polymerization reaction are insoluble therein.

Also, it is possible to use a mixture consisting of several liquids having a boiling point below about 130° C. at 760 mm Hg (abs.) which are inert to the polymerization reactants and the polymer resulting therefrom at the polymerization temperature.

Although the temperature of the polymerization is not critical, it has been found that temperatures above about 160° C. may in some cases prevent the generation of particulate matter, and thus provide a polymer having inferior properties. Consequently, it is preferred that the polymerization be conducted at temperatures below about 150° C., and more preferably at temperatures of from about 50° C. to about 140° C.

It is preferred that the polymerization be carried out in a substantially oxygen-free environment because of the free radical nature of the reaction. This can be accomplished by sweeping the reaction vessel with an inert gas such as nitrogen.

The polymerization can be carried out at subatmospheric, atmospheric or superatmospheric pressures. Preferably the polymerization is carried out at atmospheric pressure. Depending on the conditions employed, the polymerization is generally completed in from about 30 minutes up to about 10 hours.

The proportion of organic monomers to vinyl containing organopolysiloxanes may be varied within wide limits. Thus, the vinyl containing organopolysiloxane concentration may range from about 20 to 95 percent by weight based on the weight of the organic monomers and vinyl organopolysiloxanes. Even though the proportion of vinyl organopolysiloxanes may be below about 20 percent by weight based on the weight of the reactants, it is preferred that the vinyl organopolysiloxane concentration be from about 25 to 70 percent by weight based on the total weight of the reactants.

It has been found that the amount of shear exerted on the reactants and resultant products may have a substantial influence on the formation of the particulate matter, especially the formation of elongated rodlike particles. It is believed that by controlling the rate of shear exerted on the reactants, particles are formed which take on different configurations. For example, elongated rodlike particles of from 10 to 500 microns in length and from 1 to 5 microns in diameter are generated in situ by carefully controlling the shear rate. Also, it has been found that these rodlike particles greatly improve the physical properties of the resultant organopolysiloxane conposition, especially the cured polymers. Consequently, it is preferred that elongated rodlike particles be generated in order to impart improved physical properties to the resultant polymer. For example, where organopolysiloxane compositions containing rodlike structures are cured to form elastomers, the resultant elastomers exhibit improved tensile strength, elongation and tear strength values.

Since the shear rate may have a profound influence on the size and shape of in situ generated particles, it is preferred that the shear rate be in the range of from about 5 to 1,000 sec.$^{-1}$ and more preferably from about 15 to 300 reciprocal seconds. The shear rate is calculated as the linear speed of the impeller divided by its distance from the reactor wall at the point of its closest contact.

The products of this invention may be separated from the unreacted monomers by any conventional technique known in the art, such as by distillation, solvent extraction or selective solvent fractionation.

The modified organopolysiloxane compositions obtained from the polymerization reaction of the present invention include vinyl containing polysiloxanes in which some or all of the organic polymer is grafted to the organopolysiloxane chains through a carbon-to-carbon linkage and mixtures of organic homopolymers, copolymers and vinyl containing polysiloxanes.

The modified organopolysiloxane compositions of this invention are useful in the preparation of elastomers, sealants, potting compounds and as coatings. Also, these compositions are useful as molding compositions, especially where it is desired to keep shrinkage to a minimum.

These modified organopolysiloxane compositions may be used in the preparation of room temperature and heat vulcanizable elastomers. Generally these room temperature and heat vulcanizable compositions contain (A) the modified vinyl containing organopolysiloxane composition whose preparation is described above, (B)

an Si—H containing compound having on the average more than two silicon bonded hydrogen atoms per molecule as a cross-linking agent and (C) a catalyst which promotes the addition of Si—H to the vinyl group of the vinylorganopolysiloxane.

Silicon-bonded hydrogen containing compounds which may be used as cross-linking agents in the present invention are Si—H containing organopolysiloxanes. These Si—H containing organopolysiloxanes are well known and have the average unit formula

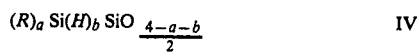

in which R is the same as above, a has a value of from 0 to 2.5, preferably from 0.5 to 2.1, b has a value of from 0.0005 to 2.0, and the sum of a and b is equal to 1.0 to 3. Suitable Si—H containing organopolysiloxanes are disclosed, for example in U.S. Pat. Nos. 3,159,662 and 3,220,972.

In Formula IV, the R radicals which may be the same or different are monovalent hydrocarbon radicals having from 1 to 18 carbon atoms. Preferably, each R radical in Formula IV is a methyl radical.

The Si—H containing organopolysiloxanes represented by Formula IV above have a viscosity of from about 10 to about 750,000 centipoise at 25° C. and more preferably from about 100 to 150,000 centipoise at 25° C.

It is to be understood that Formula IV is intended to include organopolysiloxanes which are terminated with Si—H groups or contain Si—H groups along the chain or which are Si—H terminated and also contain Si—H groups along the chain. Preferably these Si—H containing organopolysiloxanes have an average of more than two silicon-bonded hydrogen atoms per molecule.

The Si—H containing organopolysiloxanes may also be copolymers having (1) at least one siloxane unit per molecule of the formula:

where R is the same as above, c has a value of 0, 1 or 2, d has a value of 1 or 2 and the sum of c and d is equal to 1, 2 or 3 and (2) an organopolysiloxane represented by Formula IV above. Thus when the organohydrogenpolysiloxane is a copolymer having siloxane units within the scope of Formula V and siloxane units within Formula III, the copolymer generally contains from 0.1 to 99.5 mol percent of units within the scope of Formula V and from 0.5 to 99.9 mol percent of units within the scope of Formula III.

Siloxane units within the scope of Formula V are hydrogen siloxane units (H SiO$_{1.5}$), methyl hydrogen siloxane units (H Si CH$_3$O), dimethyl hydrogen siloxane units and dihydrogen siloxane units (H$_2$SiO).

A preferred class of organohydrogenpolysiloxanes within the scope of Formula IV above are those referred to as SiH terminated diorganopolysiloxanes, such as for example those having the general formula

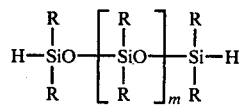

where R is the same as above, R" is the same as R or hydrogen and m has a value sufficient to provide a viscosity of from 10 to 750,000 centipoise at 25° C. It is preferred that the R groups be methyl groups. Preferably the organohydrogenpolysiloxanes have on the average more than two silicon-bonded hydrogen atoms per molecule. Suitable organohydrogenpolysiloxanes are disclosed in U.S. Pat. Nos. 2,838,218, 3,159,662 and 3,220,972.

Specific examples of organohydrogenpolysiloxanes within the scope of Formula IV above are 1,3-dimethyl-disiloxane, 1,1,3,3-tetramethyldisipoxane as well as higher polymers containing up to 100,000 silicon atoms per molecule.

The catalyst employed in the vulcanizable compositions of this invention may be any of the platinum compounds or platinum containing complexes which promote the addition of silicon-bonded hydrogen atoms to silicon bonded vinyl groups. Examples of suitable platinum compounds are chloroplatinic acid, platinum deposited on carriers such as silica gel or powdered charcoal, salts of platinum, the reaction products of chloroplatinic acid and alcohols, aldehydes and ketones, platinum-siloxane complexes, platinum-olefin complexes, platinum carboxylates, nitrile-platinum halide complexes, ammonium platinum complexes such as disclosed in U.S. Pat. No. 3,795,656 to Martin and platinum complexes of unsaturated siloxanes which are substantially free of halogen, such as disclosed in U.S. Pat. No. 3,814,730 to Karstedt. Preferably the platinum catalyst is a platinum-ketone complex such as disclosed in U.S. Pat. No. 3,798,252 to Nitzsche et al.

The proportions of the various ingredients employed in the practice of the present invention can vary within wide limits and the proportions of ingredients are not affected by the stoichiometry of the addition reactants involved, since many of the products prepared in accordance with this invention exhibit satisfactory properties even though the final product may contain unreacted vinyl groups or unreacted silicon-bonded hydrogen atoms. The Si—H containing compound and the vinyl containing organopolysiloxane obtained from the polymerization reaction are preferably present in such proportions that the reaction mixture contains at least 1.5 silicon-bonded hydrogen atoms per vinyl group. However, the silicon-bonded hydrogen atoms and vinyl groups should be present in the reaction mixture in such an amount that the final product is free of silicon-bonded hydrogen atoms and vinyl groups.

The platinum catalyst is generally added to the mixture containing the Si—H containing organopolysiloxane and the vinyl containing organopolysiloxanes obtained from the polymerization reaction in an amount based on the vinyl groups present in the composition. A satisfactory reaction will occur when the catalyst composition is present in an amount sufficient to provide as little as one atom of platinum per million vinyl groups present in the vinyl containing organopolysiloxane. The catalyst may be present in an amount to provide as high as one platinum atom per thousand vinyl groups. In general, it is preferred that the platinum catalyst be employed in an amount sufficient to provide from one platinum atom per 1,000 to one platinum atom per 100,000 vinyl groups in the vinyl containing organopolysiloxanes.

When employing exceptionally small quantities of the platinum catalyst, it is often desirable to dissolve the latter in a solvent which is inert to the reactants under the conditions of the reaction so as to facilitate uniform dispersion or solution of the platinum catalyst in the Si—H containing organopolysiloxanes and the vinyl containing organopolysiloxanes obtained from the polymerization reaction. Suitable solvents include, for example, hydrocarbon solvents such as benzene, toluene, xylene, mineral spirits, halogenated alkanes as well as oxygenated solvents such as dioxane, ethanol, butanol and the like. Where a diluent or solvent is employed, the amount of the latter is not critical. Satisfactory solutions of platinum catalysts can be prepared which contain from 0.1 to 0.0001 part of platinum catalyst per part of solvent.

The composition obtained by mixing Si—H containing organopolysiloxanes with the vinyl containing modified organopolysiloxanes obtained from the polymerization reaction and platinum catalyst can be vulcanized at temperatures as low as room temperature up to temperatures of the order of 100° to 150° C. The time required for vulcanization can vary over wide limits, depending upon the particular reactants involved, the proportions of reactants and the reaction temperature. Thus, curing can be effected at times which vary from a few minutes up to 24 hours or more. If all other factors are equal, the rate of reaction increases as the temperature increases and as the concentration of the platinum catalyst in the reaction mixture increases.

Where it is desired to store these curable compositions for a period of time, it is preferred that the compositions be prepared in two separate packages, which are later combined at a time when the compositions are to be cured, i.e., converted to an elastomeric state. In the case of a two package formulation, the vinyl containing modified organopolysiloxanes prepared in accordance with this invention and the platinum catalyst are placed in one package and the Si—H containing organopolysiloxanes and any other fillers or additives are placed in the second package. These packages are merely mixed at the point of use and the mixture cured.

While the curable compositions of the present invention are sufficiently reinforced by the presence of the in situ generated particulate matter, additional fillers and other additives may be incorporated therein. Examples of suitable fillers which may be employed in the curable compositions are fumed silica, high-surface-area precipitated silica, silica aerogels as well as coarser silicas such as diatomaceous earth, crushed quartz and the like. Other fillers which may be used are metallic oxides such as titanium oxide, ferric oxide, zinc oxide and fibrous fillers such as asbestos, fibrous glass and the like. Additives such as pigments and antioxidants and ultraviolet absorbents and the like may also be included in these compositions.

Various embodiments of this invention are further illustrated by the following examples in which all parts are by weight unless otherwise specified.

PREPARATION OF MODIFIED VINYL CONTAINING ORGANOPOLYSILOXANE COMPOSITIONS

EXAMPLE I

A mixture containing 156.5 parts of styrene, 126.5 parts of n-butyl acrylate, 187.5 parts of a vinyl endblocked dimethylpolysiloxane having a viscosity of 500 centipoise at 25° C. and a vinyl content of about 0.38 percent, 3 parts of 1,1,-di-t-butylperoxy-3,3,5-trimethylcyclohexane and 24 parts of water are added to a 1-liter glass reactor equipped with a stirrer, nitrogen inlet, reflux condenser and oil bath. The system is flushed with nitrogen and heated to a temperature of about 95° C. with agitation for about 5 hours and then stripped for one hour at 100° C. and for an additional hour at 120° C. The viscosity of the resultant product is measured with a Brookfield Viscometer at 25° C. and found to be 8,250 centipoise at 25° C. The product, which is a white opaque viscous material contains elongated particulate matter when viewed under a microscope ($\times$430).

EXAMPLE 2

A mixture containing 211 parts of styrene, 141 parts of a vinyl endblocked dimethylpolysiloxane having a viscosity of 2000 centipoise at 25° C. and a vinyl content of 0.34 percent and 2.3 parts of 1,1-di-t-butylperoxy-3,3,5-trimethylcyclohexane are added to a 1-liter glass reactor equipped with a stirrer, nitrogen inlet, reflux condenser and oil bath. The system is flushed with nitrogen and heated to a temperature of about 96° C. with agitation for about 5 hours and then stripped for one hour at 100° C. and for an additional hour at 120° C.

EXAMPLE 3

A mixture containing 82 parts of styrene, 408 parts of butyl acrylate, 328 parts of a vinyl endblocked dimethylpolysiloxane having a viscosity of 200 centipoise and a vinyl content of 0.34 percent, 3 parts of 1,1,-di-t-butylperoxy-3,3,5-trimethylcyclohexane and 40 parts of water are added to a 1-liter glass reactor equipped with a stirrer, nitrogen inlet, reflux condenser and oil bath. The system is flushed with nitrogen and heated to a temperature of 97° C. with agitation for about 6 hours and then stripped for one hour at 100° C. and for an additional hour at 120° C.

EXAMPLE 4

A mixture containing 200 parts of butyl acrylate, 55 parts of acrylonitrile, 170 parts of vinyl endblocked dimethylpolysiloxane having a viscosity of 4000 centipoise at 25° C. and a vinyl content of 0.37 percent, 2 parts of 1,1-di-t-butylperoxy-3,3,5-trimethylcyclohexane and 20 parts of water are added to a 1-liter glass reactor equipped with a stirrer, nitrogen inlet, reflux condenser and oil bath. The system is flushed with nitrogen and heated to a temperature of about 97° C. with agitation for about 4 hours and then stripped for one hour at 100° C. and for an additional hour at 120° C.

EXAMPLE 5

A mixture containing 198 parts of vinylchloride, 462 parts of a trimethylsiloxy-terminated polysiloxane copolymer having a viscosity of 400 centipose at 25° C. and consisting of 2 mol percent methylvinylsiloxane units with the remainder of the diorganopolysiloxane units being dimethylsiloxane units and 3.3 parts of 1,1-di-t-butylperoxy-3,3,5-trimethylcyclohexane are added to a 1-liter glass reactor equipped with a stirrer, nitrogen inlet, reflux condenser and oil bath. The system is flushed with nitrogen and heated to a temperature of about 92° C. with agitation for about 7 hours, and then stripped for one hour at 100° C. and for an additional hour at 120° C.

EXAMPLE 6

A mixture containing 325 parts of vinyl acetate, 304 parts of a copolymer having a viscosity of 1,000 centipoise at 25° C. consisting of dimethylvinylsiloxane units, dimethylsiloxane units, methylvinylsiloxane units, and trimethylsiloxane units in a mol ratio of 1.9, 4.9, 3.1 and 0.1 respectively, and 2.1 parts of tert-butylperoctoate are added to a 1-liter glass reactor equipped with a stirrer, nitrogen inlet, reflux condenser and oil bath. The system is flushed with nitrogen and heated to a temperature of about 82° C. with agitation for about 6 hours, and then stripped for one hour at 100° C. and for an additional hour at 120° C. A white viscous opaque fluid is obtained.

EXAMPLE 7

A mixture containing 255 parts of vinylidene chloride, 255 parts of the polysiloxane fluid of Example 1, and 1.7 parts di-t-butylperoxide are added to a 1-liter glass reactor equipped with a stirrer, nitrogen inlet, reflux condenser and oil bath. The system is flushed with nitrogen and heated to a temperature of about 125° C. with agitation for about 5 hours, and then stripped for one hour at 100° C. and for an additional hour at 120° C. A white viscous opaque fluid is obtained.

EXAMPLE 8

A mixture containing 230 parts of styrene, 189 parts of butyl acrylate, 23 parts of allyl methacrylate, 278 parts of the polysiloxane fluid of Example 1, and 2.3 parts of di-t-butylperoxide are added to a 1-liter glass reactor equipped with a stirrer, nitrogen inlet, reflux condenser and oil bath. The system is flushed with nitrogen and heated to a temperature of about 125° C. with agitation for about 6 hours, and then stripped for one hour at 100° C. and for an additional hour at 120° C. A white viscous opaque product is obtained.

EXAMPLE 9

The procedure of Example 1 is repeated except that 200 parts of methylvinylpolysiloxane containing 1.0 mol percent methylvinylsiloxane units, 1.0 mol percent dimethylvinylsiloxane units and 98 mol percent dimethylsiloxane units and having a viscosity of about 350 centipoise at 25° C. are substituted for the polysiloxane of Example 1. A white viscous composition is obtained.

EXAMPLE 10

The procedure of Example 8 is repeated except that 450 parts of a methylvinylpolysiloxane having a viscosity of 4000 centipoise at 25° C. and containing about 1.0 mol percent dimethylvinylsiloxane units, 1.0 mol percent methylvinylsiloxane units and 98 mol percent dimethylsiloxane units are substituted for the polysiloxane fluid of Example 8.

EXAMPLE 11

The procedure of Example 1 is repeated except that 100 parts of a copolymer containing dimethylsiloxane, methylvinylsiloxane units and trimethylsiloxane units having a ratio of dimethylsiloxane units to methylvinylsiloxane units of 12:1 and a viscosity of 4,000 centipoise at 25° C. are substituted for the methylvinylpolysiloxanes of Example 1.

PREPARATION OF VULCANIZED COMPOSITIONS

EXAMPLE 12

A mixture containing 50 parts of the modified organopolysiloxane composition of Example 1, 0.1 part of a chloroplatinic acid-amino-functional fluid complex prepared in accordance with Example 1 of U.S. Pat. No. 3,795,656 and 4 parts of an organohydrogenpolysiloxane fluid having a viscosity of 50 centipoise at 25° C. and a mol ratio of $=Si(CH_3)_2$ to $=SiH\ CH_3$ of 5:1 are placed in an oven at 100° C. After one hour the material cured to an elastomeric solid.

EXAMPLE 13

A mixture containing 36 parts of the modified organopolysiloxane composition of Example 1, 1 part of a 0.01 percent by weight solution of chloroplatinic acid in isopropanol and a sufficient amount of a methylhydrogenpolysiloxane fluid containing 5 mol percent methylhydrogensiloxane units to provide 1.5 silicon-bonded hydrogen groups per silicon-bonded vinyl group, is heated to 120° C. The composition cured to an elastomer in less than one hour.

EXAMPLE 14

A mixture containing 22 parts of the modified organopolysiloxane composition of Example 1, 1.65 parts of 1,3,5,7-tetramethylcyclotetrasiloxane and 0.6 part of an amino-functional platinum catalyst prepared in accordance with Example 1 of U.S. Pat. No. 3,795,656 is heated to 115° C. The composition cured to an elastomeric solid in 9 minutes.

EXAMPLE 15

The procedure of Example 14 is repeated except that 10 parts of the modified organopolysiloxane of Example 2 is substituted for the modified organopolysiloxane composition of Example 1. The composition cured to an elastomeric solid when heated to 115° C.

EXAMPLE 16

The procedure of Example 14 is repeated except that the composition of Example 4 is substituted for the modified composition of Example 1. An elastomer is obtained after heating to 115° C. for about 12 minutes.

EXAMPLE 17

The procedure of Example 14 is repeated except that a copolymer having a viscosity of 2,000 centipoise at 25° C. and containing 95 mol percent of dimethylsiloxane units and 5 mol percent of methylhydrogensiloxane units is mixed with the modified organopolysiloxane of Example 8 and cured at 115° C. to form an elastomeric solid.

Although specific examples of the invention have been described herein, it is not intended to limit the invention solely thereto, but to include all the variations and modifications falling within the spirit and scope of the appended claims.

What is claimed is:

1. A composition containing in-situ generated particulate matter comprising vinyl terminated organopolysiloxanes in which a polymeric organic group is grafted to the organopolysiloxanes through a carbon-to-carbon linkage, said polymeric organic group is constituted of recurring units derived from at least one monomer having ethylenic unsaturation, said composition is obtained from the polymerization of at least one organic monomer having ethylenic unsaturation in the presence of vinyl terminated organopolysiloxanes having a viscosity of from 10 to 10,000,000 centipoise at 25° C., a free radical initiator and an inert liquid medium having a boiling point below about 130° C. at 760 mm Hg which is a nonsolvent for the polymerization components and polymerization products at the polymerization temperature and at a shear rate of from 5 to 1000 sec.$^{-1}$, in which the organic monomer is present in an amount of from 80 to 5 percent by weight and the vinyl terminated organopolysiloxanes are present in an amount of from 20 to 95 percent by weight based on the weight of the organic monomer and vinyl terminated organopolysiloxanes, said in-situ generated, particulate matter ranges from about 10 to 500 microns in length and from 1 to 5 microns in diameter and is formed as a result of the free radical polymerization of at least one monomer having ethylenic unsaturation in the presence of the vinyl terminated organopolysiloxanes.

2. The composition of claim 1, wherein the vinyl terminated organopolysiloxanes are present in an amount of from 25 to 70 percent by weight based on the weight of the vinyl terminated organopolysiloxanes and organic monomer.

3. The composition of claim 1, wherein the polymerization is conducted at a temperature of from 50° to 160° C.

4. The composition of claim 1, wherein the polymerization is conducted in the presence of an organic peroxide.

5. The composition of claim 1, wherein the vinyl terminated organopolysiloxanes are represented by the formula

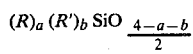

where R is a monovalent hydrocarbon radical free of aliphatic unsaturation, R' is a vinyl group, a has a value of from 0 to 2.5, b has a value of from 0.0005 to 2.0 and the sum of a and b is from 1.0 to 3.

6. The composition of claim 1, wherein the vinyl terminated organopolysiloxanes are copolymers having at least one siloxane unit of the formula

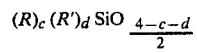

and the remaining siloxane units are

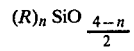

where R is a monovalent hydrocarbon radical free of aliphatic unsaturation, R' is a vinyl radical, c has a value of 0, 1 or 2, d has a value of 1 or 2 and the sum of c and d is equal to 1, 2 or 3 and n has a value of 0, 1, 2 or 3.

7. The composition of claim 1, wherein the vinyl terminated organopolysiloxanes are represented by the formula

where R is a monovalent hydrocarbon radical free of aliphatic unsaturation and y has a value sufficient to provide a viscosity of from 10 to 750,000 centipoise at 25° C.

8. The composition of claim 7, wherein R is an alkyl radical.

9. The composition of claim 8 where R is a methyl radical.

10. The composition of claim 1, wherein the polymeric organic group is constituted of recurring units derived from at least two monomers having ethylenic unsaturation.

11. The composition of claim 10, wherein at least one of the monomers is a non-conjugated polyolefinic monomer.

12. A vulcanizable composition containing (A) the composition of claim 1, (B) an organosilicon compound having on the average more than two hydrogen atoms per molecule which is capable of cross-linking with (A) and (C) a catalyst capable of promoting the addition of silicon-bonded hydrogen groups to silicon-bonded vinyl groups.

13. The composition of claim 12, wherein the organosilicon compound is an organohydrogenpolysiloxane.

14. The composition of claim 12, wherein the organosilicon compound is represented by the formula

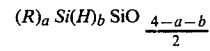

where R is a monovalent hydrocarbon radical free of aliphatic unsaturation, a has a value of from 0 to 2.5, b has a value of from 0.0005 to 2.0 and the sum of a and b is equal to 1.0 to 3.

15. The composition of claim 12, wherein the organosilicon compound is a copolymer having at least one unit of the formula

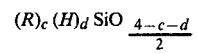

and the remaining siloxane units are

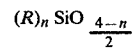

where R is a monovalent hydrocarbon radical free of aliphatic unsaturation, c has a value of 0, 1 or 2, d has a value of 1 or 2 and the sum of c and d is equal to 1, 2 or 3 and n has a value of 0, 1, 2 or 3.

16. The composition of claim 12, wherein the organosilicon compound is an organohydrogenpolysiloxane fluid of the formula

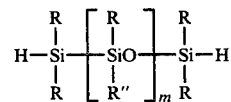

where R is a monovalent hydrocarbon radical free of aliphatic unsaturation, R" is selected from the group consisting of R and hydrogen and m has a value sufficient to provide a viscosity of from 10 to 750,000 centipoise at 25° C.

17. The composition of claim 12, wherein the composition contains an inorganic filler.

18. The cured composition of claim 12.

* * * * *